Aug. 5, 1924.
O. E. CLARK ET AL
1,504,190
TRAILER
Filed Jan. 30, 1922   5 Sheets-Sheet 2
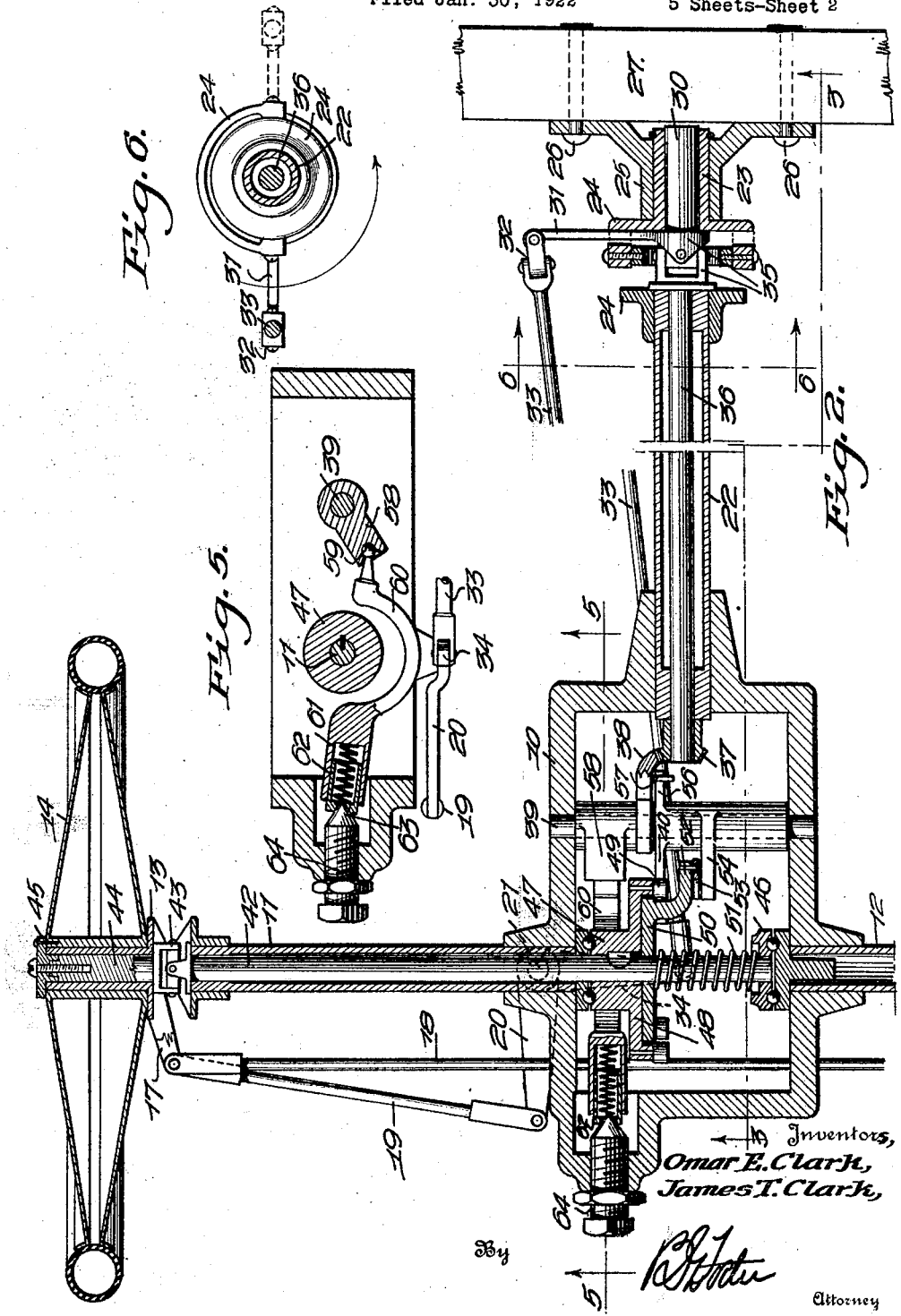
Inventors,
Omar E. Clark,
James T. Clark,
By
Attorney

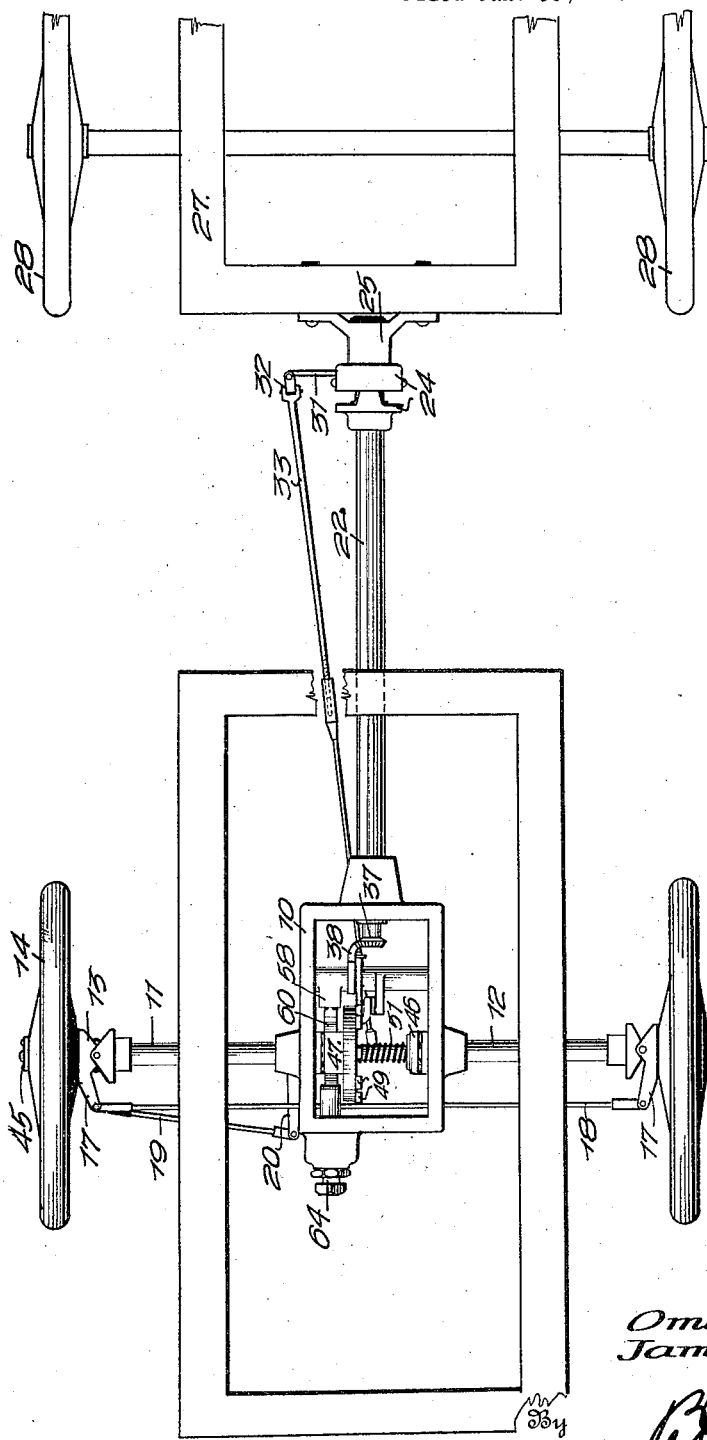

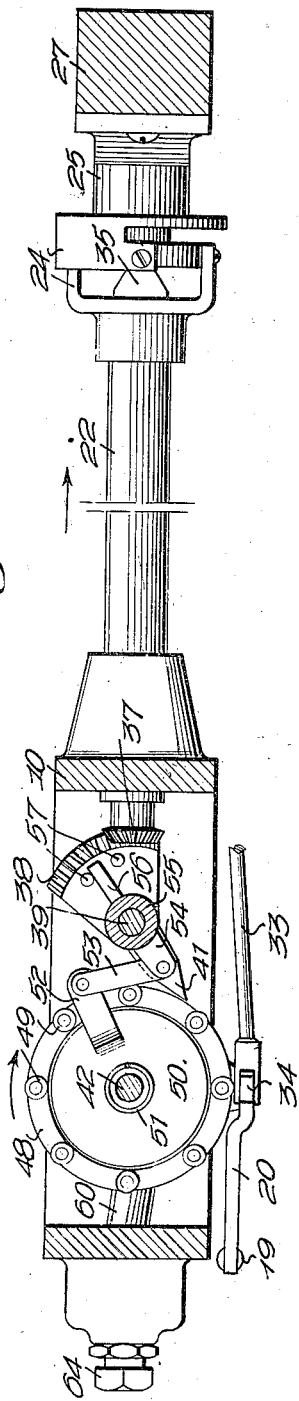
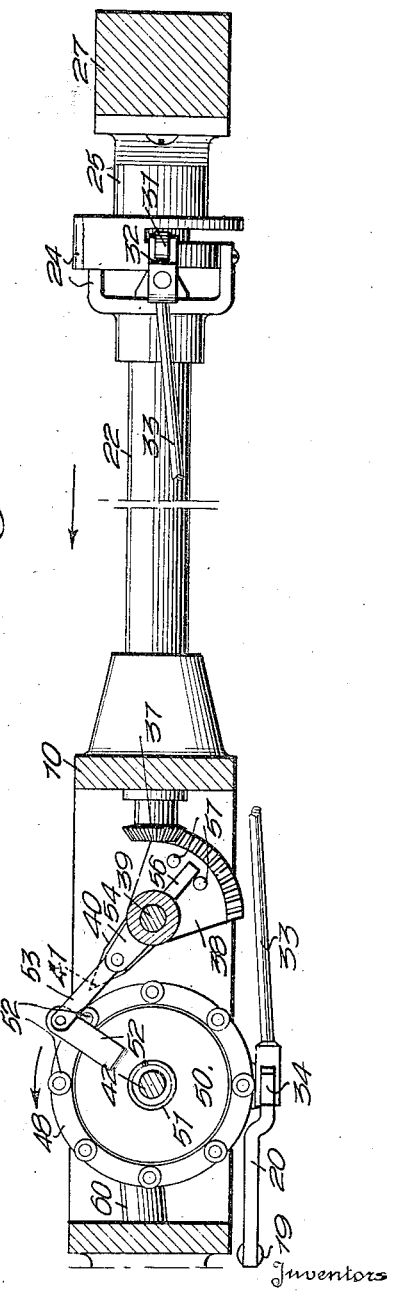

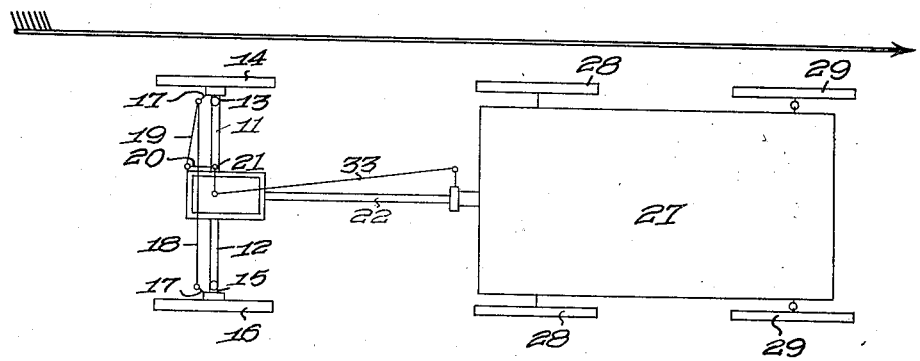
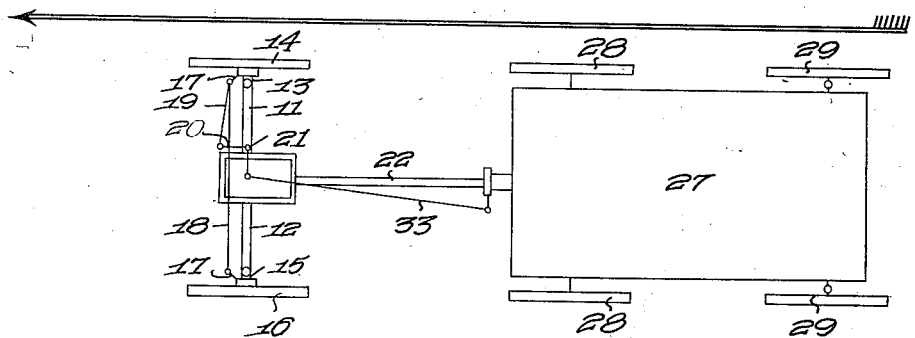

Aug. 5, 1924.

O. E. CLARK ET AL 1,504,190

TRAILER

Filed Jan. 30, 1922

5 Sheets-Sheet 5

INVENTORS,
Omar E. Clark
James T. Clark
BY
ATTORNEY.

Patented Aug. 5, 1924.

1,504,190

UNITED STATES PATENT OFFICE.

OMAR E. CLARK AND JAMES T. CLARK, OF DENVER, COLORADO.

TRAILER.

Application filed January 30, 1922. Serial No. 532,736.

*To all whom it may concern:*

Be it known that we, OMAR E. CLARK and JAMES T. CLARK, citizens of the United States, residing at Denver, in the county of Denver and State of Colorado, have invented certain new and useful Improvements in Trailers, of which the following is a specification.

The present invention relates to trailers for automobiles and the like.

The primary object is to provide means whereby the trailer will properly follow in the track of the draft vehicle during the forward movement of the latter, and irrespective of the turns it may make, and will also properly move rearwardly, both in a straight line and when backing into a turnout, or to a curve, so that it will position itself properly and automatically under various conditions.

In the accompanying drawings:—

Figure 1 is a plan view of the preferred embodiment of the invention,

Figure 2 is a horizontal sectional view through the running gear and steering mechanism, Figure 3 is a sectional view on the line 3—3 of Figure 2, showing the relation of the parts during the forward movement of the vehicle and trailer, Figure 4 is a view similar to Figure 3, but illustrating the relation of the parts during the backward movement of the vehicle and trailer, Figure 5 is a cross sectional view on the line 5—5 of Figure 2, Figure 6 is a sectional view on the line 6—6 of Figure 2, Figure 7 is a diagrammatic view indicating the relation of the parts during the forward movement of the vehicle and trailer.

Figure 9:
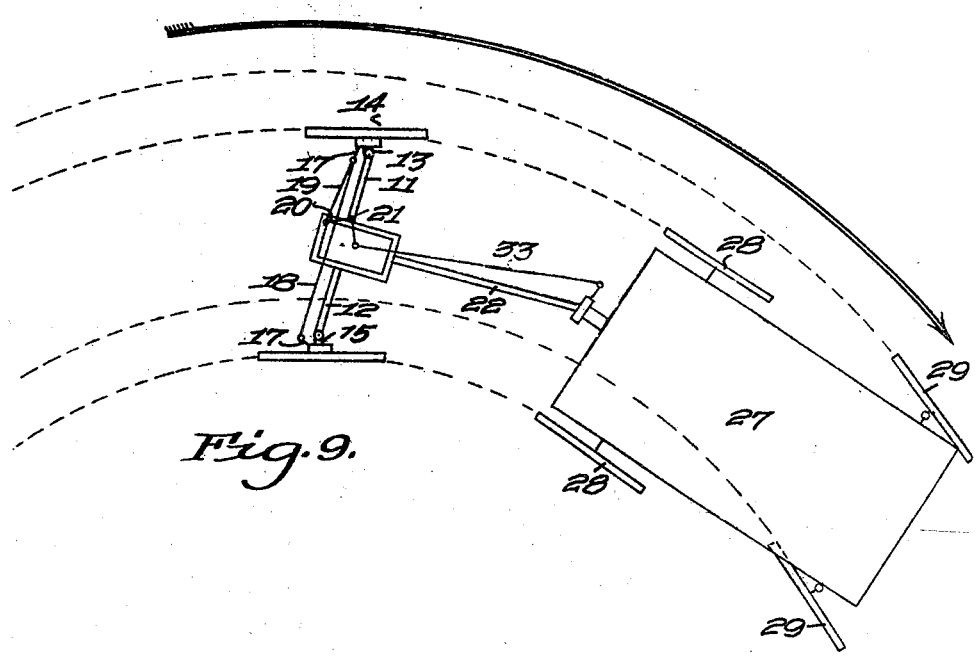
Figure 10:
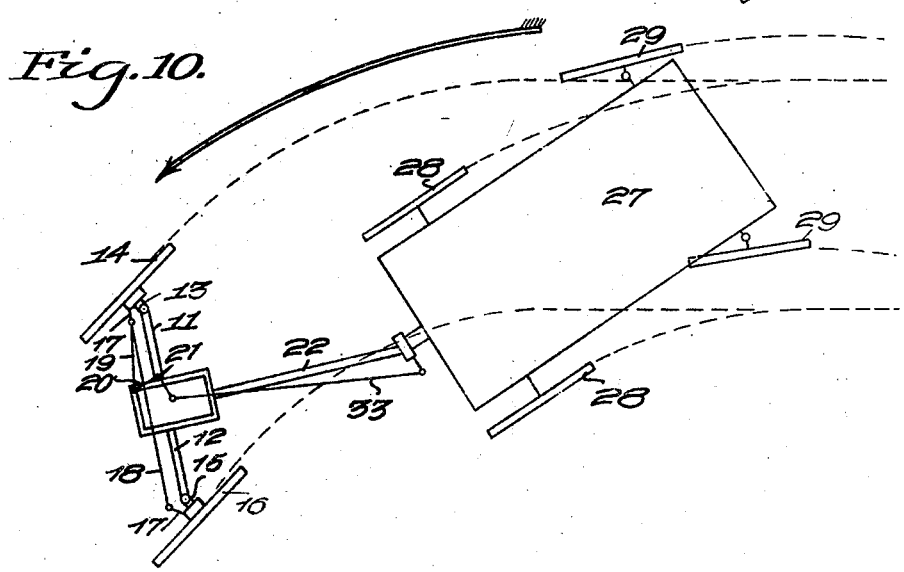

Figure 8 is a similar view, but showing the relation of the parts during the retrograde movement of the vehicle and trailer, Figure 9 is a diagrammatic view illustrating the relation of the parts when the vehicle and trailer are moving forwardly on a curve, Figure 10 is a diagrammatic view showing the arrangement during the backward turning movement of the vehicle and trailer.

In order to avoid confusion, the frame and body of the trailer has not been illustrated. The running gear includes a frame boxing 10, from the opposite sides of which project tubular axle sections 11 and 12. The axle section 11 has pivoted to its free end a tubular spindle 13, on which is journaled a supporting and steering wheel 14. Pivotally mounted on the other axle section is a spindle 15, on which is journaled a supporting and steering wheel 16. The two spindles are provided with arms 17 coupled by a connecting rod 18 and an actuating link 19 pivoted to one of the arms 17, is also pivoted to one arm 20 of a bell crank suitably fulcrumed, as indicated at 21, on the frame boxing 10.

A draft device is connected to the front end of the frame boxing 10, and consists of a tubular rod 22 forming a rear section and a gudgeon 23 forming a front section. These two sections are connected by a universal coupling 24. The gudgeon 23 is rotatably mounted in a box 25 adapted to be secured, as illustrated at 26, to the rear end of a draft vehicle as 27. This vehicle may be of any desired construction, and as indicated in Figures 7–10 is provided with rear wheels 28 and front steering wheels 29. Rotatably mounted in the gudgeon 23 is a stub shaft 30 having a crank arm 31, to which is connected by a universal coupling 32, a controller rod 33 that extends longitudinally of the draft device and is connected to the other arm 34 of the bell crank.

The stub shaft 30 is connected by a universal coupling 35 to a shaft 36 journaled longitudinally in the tubular section 22 of the draft device, and said shaft 36 is provided at its rear end within the frame boxing with a beveled gear 37 in mesh with a gear segment 38 fixed to a rock shaft 39. The gear segment 38 forms part of an arm 40 that terminates in a pointed end 41.

Rotatably mounted in the axle section 11 is a shaft 42 having a universal coupling 43 with a stub shaft 44 that is journaled in the spindle 13. The stub shaft 44 is connected at its outer end, as shown at 45, with the wheel 14, so that when said wheel rotates it turns the shaft 44, and through the coupling 43, also revolves the shaft 42. The inner end of said shaft 42 has a thrust-bearing 46, and keyed to said shaft 42 within the frame box 10 is the hub 47 of a friction disk 48. This disk is provided with a circular series of spaced projections, preferably in the form of rollers 49. Another disk 50, loosely journaled on the shaft 42, is held in frictional engagement with the disk 48 by a coiled spring 51 interposed between the thrust-bearing 46 and said disk 50, and mounted on the shaft 42. The friction disk 50 has an arm 52 which is connected by a link 53 with another arm 54 carried by a collar 55 that is loosely journaled on the shaft 39 and this collar has a finger 56 that plays between a pair of spaced stops 57 carried by the gear segment 38.

The shaft 39 is also provided within the frame box 10 with a crank arm 58 having a ball and socket connection 59 with a swinging arm 60 that is provided in its end opposite the ball and socket connection 59 with a socket 61. In this socket is a spring-pressed plunger 62 that has a bearing against the pointed end 63 of an adjustable pivot screw 64.

When the trailer is connected to a draft vehicle and is moving in a straight line forwardly, the relation of the parts is as shown in Figures 2, 3 and 7. The arm 31 will be at the left hand side of the draft device and the wheels will be held in a straight-line direction. If a turn is made by the draft vehicle while moving forwardly, the relation of the arm 31 with respect to the draft section 22 changes, and as a consequence the bell crank 20—34 is swung, thereby turning the wheels 14—16, and this turning movement is just sufficient to cause said wheels to follow the rear wheels 28 of the draft vehicle. Obviously therefore the trailer will not cut across the corner, but will clear any obstacle that the rear wheels of the draft vehicle clear. In this forward movement, the point 41 of the arm 40 will be just out of the path of the rollers 49 carried by the friction disk 48, which disk will be continuously rotated by the wheel 14. If, however, after a forward movement the draft vehicle is backed, then obviously the disk 48 with the rollers 49 will be turned in an opposite direction. The friction disk 50 will initially move with it, thereby turning the arm 54, collar 55 and finger 56 until said finger strikes the lower stop 57, whereupon the gear segment 38 will be turned and the finger 41 brought into the path of one of the rollers 49. When this takes place, the arm 40 and gear segment will be positively turned and this turning movement will be transmitted through the gear 37, and shaft 36 to the stub shaft 30, thereby rotating the arm 31 and causing it to assume a position on the opposite or right hand side of the draft device. This movement will be continued until the point 41 of the arm 40 is moved by the roller beyond the dead center of the arms 58 and 60 whereupon the spring plunger 62 will act to complete the swinging movement of the arm 40 until the pointed end 41 is again out of the path of the rollers 49. When the arm 31 and the controlling link 33 are on the right hand side of the draft device the trailer wheels 14 and 16 remain in parallel relation to the wheels of the draft vehicle as long as the said draft vehicle moves in a straight line, as shown in Figure 8, but if the front wheels of the draft vehicle are turned to back to one side of a straight line of travel, then the relation of the controlling link 33 and draft device section 22 are altered, and as indicated in Figure 10 the trailer wheels are consequently turned so that they maintain a relation substantially parallel to the rear wheels of the draft vehicle (it being understood that said draft vehicle is now, in effect, acting as a pushing agent). The trailer will thus move in substantially parallel relation to the rear end of the vehicle, and can be brought up to a curb or into a turn-out without difficulty. As soon as the vehicle is straightened out the trailer will immediately assume a position directly behind the same. A reverse or forward movement of the vehicle and trailer again reverses the action and position of the above described parts.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described our invention, what we claim as new, and desire to secure by Letters Patent, is:—

1. The combination with a trailer having shiftable supporting wheels, of means for coupling the trailer to a draft vehicle, a controlling link for the trailer wheels extending longitudinally of the coupling means and having its front end shiftable to opposite sides of the same, and means operated by the wheels on their reverse rotation for automatically shifting said front end.

2. The combination with a trailer having shiftable supporting wheels, of means for coupling the trailer to a draft vehicle, a controlling link for the trailer wheels extending longitudinally of the coupling means and having its front end shiftable to opposite sides of the same, and means mounted on the coupling means and operated by the wheels on their reverse rotation for automatically shifting said front end.

3. The combination with a trailer, of spindles pivotally mounted thereon and wheels journaled on the spindles, a draft device for connecting the trailer to a draft vehicle, steering mechanism connected to the spindles and including a controlling member having a portion at the front end of the draft device shiftable to different positions with respect to the draft device, and means for automatically shifting said portion upon the reverse movements of the trailer.

4. The combination with a trailer, of spindles pivotally mounted thereon and wheels journaled on the spindles, a draft device for connecting the trailer to a draft vehicle, steering mechanism connected to the spindles and including a controlling member having a front end at the front end of the draft device and shiftable to positions on opposite sides of the draft device, and means operated by the trailer for automatically shifting the front end of the controlling member when the direction of movement of the trailer is reversed.

5. The combination with a trailer, of spindles pivotally mounted thereon and wheels journaled on the spindles, arms on the spindles, a coupling between the arms, a lever connected to one of the arms, a draft device, a controlling link extending longitudinally of the draft device, and means operated by the trailer for shifting the front end of the controlling link to different positions with respect to the draft device upon the reverse movements of the trailer.

6. The combination with a trailer, of supporting wheels swingingly mounted thereon, a draft device having means for attachment to a draft vehicle, steering mechanism including a controlling member, a mounting element for the controlling member movably supported on the draft device, and means actuated by one of the wheels for moving said mounting element on the draft device when the direction of rotation of the wheel is reversed.

7. The combination with a trailer, of supporting wheels swingingly mounted thereon, a draft device having means for attachment to a draft vehicle, steering mechanism including a controlling member, a mounting element for the controlling member swingingly supported on the front portion of the draft device, and means actuated by one of the wheels for swinging said mounting element on the draft device when the direction of rotation of the wheel is reversed.

8. The combination with a trailer, of wheel spindles pivotally mounted thereon, and wheels on the spindles, a draft device for the trailer, including front and rear sections having a flexible coupling between them, steering means connected to the wheels and including an arm rotatable on the front section, and a controlling rod engaged with said arm, means for shifting said arm extending longitudinally of the draft device, and operating mechanism including clutch means operated by the wheel and connected to the shifting means for moving the same.

9. The combination with a trailer, of wheel spindles pivotally mounted thereon and wheels on the spindles, a draft device for the trailer, including front and rear sections having a flexible coupling between them, steering means connected to the wheels and including an arm rotatable on the front section, and a controlling rod engaged with said arm, a shaft on the draft device geared to the arm, a shaft operating means, and a friction element operated by one of the wheels and engaged with said shaft operating means for operating the same.

10. The combination with a trailer, of wheel spindles pivotally mounted thereon and wheels on the spindles, a draft device for the trailer, including front and rear sections having a flexible coupling between them, steering means connected to the wheels and including an arm rotatable on the front section and a controlling rod engaged with said arm, a shaft on the draft device geared to the arm, a throw arm connected to the shaft, and actuating means for the throw arm including a device rotated by one of the wheels, and friction means also operated by one of the wheels for moving the arm into engagement with the device.

11. The combination with a trailer, of wheel spindles pivotally mounted thereon and wheels on the spindles, a draft device for the trailer including front and rear sections having a flexible coupling between them, steering means connected to the wheels and including an arm rotatable on the front section and a controlling rod engaged with said arm, a shaft on the draft device geared to the arm, a throw arm connected to the shaft, and actuating means for the throw arm including a device rotated by one of the wheels and having a series of projections adapted to engage the arm, and a disk frictionally engaged with the device and connected to the throw arm.

12. The combination with a trailer having shiftable wheels, of a tubular draft member for connecting the trailer to a draft vehicle, a controlling link extending longitudinally of the rod and connected at its rear end to the wheels, a shaft on the draft device, a crank arm operated by the shaft and connected to the front end of the controlling link, and means actuated by one of the wheels on its reverse movements for effecting a limited rotation of the shaft in opposite directions.

13. The combination with a trailer, of wheel spindles pivotally mounted thereon and wheels on the spindles, a draft device for the trailer, including front and rear sections having a flexible coupling between them, steering means connected to the wheels and including an arm rotatable on the front section and a controlling rod engaged with said arm, a shaft on the draft device geared to the arm, a throw arm connected to the shaft, and actuating means for the throw arm including a device rotated by one of the wheels and having a series of projections adapted to engage the arm, a disk frictionally engaged with the device and connected to the throw arm, and a spring device connected to the arm for completing its movement.

14. The combination with a frame having a draft device comprising front and rear sections having a universal connection, of wheel spindles pivoted on the frame, wheels on the spindles, a connection between the spindles and a bell crank on the frame connected to one of the spindles, a controlling rod connected to the bell crank and extending alongside the draft device, an arm pivoted on the front section of the draft device and connected to the controlling arm, a shaft in said draft device connected to the arm, a throw arm geared to the shaft, a disk connected to one of the wheels and having projections adapted to engage the throw arm, a disk frictionally engaged with the first disk, and connected to the throw arm for moving the latter into the path of the disk, and spring mechanism connected to the throw arm for moving the same out of the path of the projections.

In testimony whereof we affix our signatures in the presence of two witnesses.

OMAR E. CLARK.
JAMES T. CLARK.

Witnesses:
 WILL C. NEAHR,
 GEORGE A. SHAW.